(12) United States Patent  
Tine, Jr.

(10) Patent No.: US 6,484,746 B2  
(45) Date of Patent: Nov. 26, 2002

(54) FUEL VALVES

(76) Inventor: Theodore J. Tine, Jr., 56 High St., Portland, CT (US) 06480

( * ) Notice: Subject to any disclaimer, the term of this patent is extended or adjusted under 35 U.S.C. 154(b) by 0 days.

(21) Appl. No.: 09/834,069

(22) Filed: Apr. 12, 2001

(65) Prior Publication Data

US 2002/0148509 A1 Oct. 17, 2002

(51) Int. Cl.$^7$ ................................................ E03B 11/00
(52) U.S. Cl. ........................ 137/351; 137/553; 137/590; 251/297
(58) Field of Search ................................ 137/590, 553, 137/351; 251/297

(56) References Cited

U.S. PATENT DOCUMENTS

| | | | | |
|---|---|---|---|---|
| 1,605,619 A | * | 11/1926 | Schreiner | 137/590 |
| 4,250,921 A | * | 2/1981 | Pingel et al. | 137/625.41 |
| 4,890,644 A | * | 1/1990 | Hoeptner, III et al. | 137/625.41 |
| 5,368,058 A | * | 11/1994 | Gold et al. | 137/1 |
| 6,129,338 A | * | 10/2000 | Golan | 251/310 |

FOREIGN PATENT DOCUMENTS

IT 4347777 * 7/1948 ................ 137/590

\* cited by examiner

*Primary Examiner*—A. Michael Chambers  
(74) *Attorney, Agent, or Firm*—Robert H. Montgomery

(57) ABSTRACT

A manually operated fuel valve having OFF, ON and RESERVE positions which comprises a valve body with a standpipe extending therefrom for receiving fuel from a fuel tank and supplying fuel to an engine the said valve is in an ON position. the valve body defines a first passage therethrough in communication with the standpipe for permitting passage of fuel to a fuel exit port when the valve is in the ON position. The valve body defines a second passage therethough for fuel to said exit port when the valve is in a RESERVE position. A rotatable fuel regulator member is positioned in the valve body for blocking the second passage when the regulator member is in a valve ON position and permitting passage of fuel through the standpipe and the first passage. The regulator member is effective to block passage of fuel from passing through both of the passages when rotated to an OFF position. The regulator has a third position intermediate the ON and OFF positions for permitting passage of fuel from the tank to the exit port through the second passage when the level of fuel in the tank falls below the top of the standpipe, and means are coupled to the regulator member for rotation therewith and arranged to provide a positive indication when said regulator is in the third position.

6 Claims, 5 Drawing Sheets

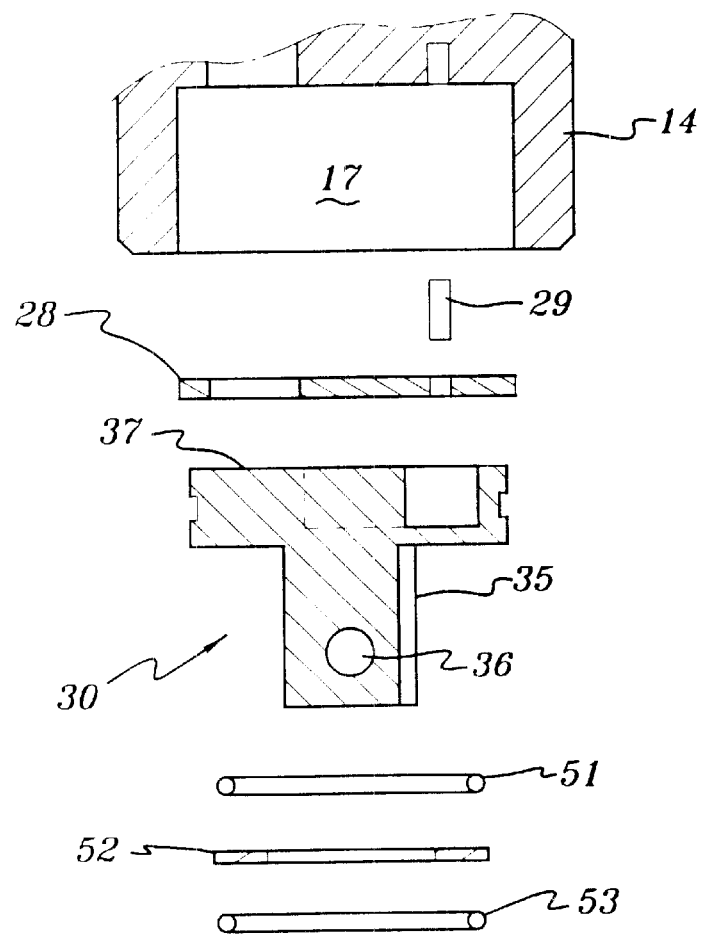
Fig. 5
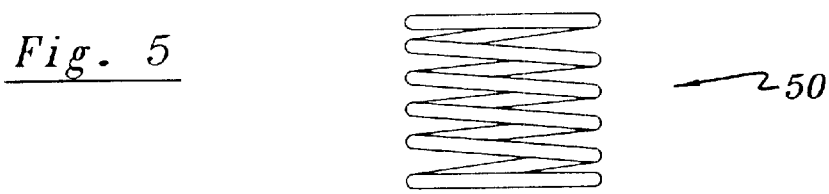
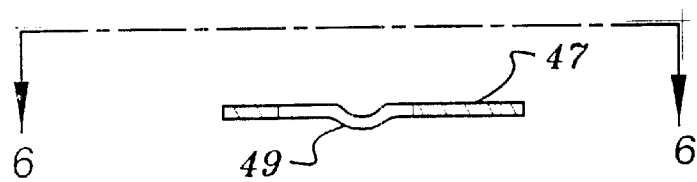

FUEL VALVES

FIELD OF THE INVENTION

This invention relates to fuel control valves and more particularly relates to fuel control valves for small vehicles such as motorcycles.

BACKGROUND OF THE INVENTION

Motorcycles generally have a gas tank just forward of the saddle and fuel is delivered to the engine by gravity feed. A fuel valve having fuel OFF and ON positions and an intermediate Reserve (RES) is located at the bottom of the tank. The valve is actuated by a finger toggle or lever. The valves have small standpipes extending upwardly into the tank. When the fuel level falls below the top of the standpipe the engine will begin to sputter and the cyclist must reach down and move the valve toggle to an intermediate fuel RES position to permit the fuel below the top of the standpipe to be utilized until there is opportunity to refuel. The fuel valve is not visible by the cyclist when the cyclist is in the saddle and the valve must be repositioned by the cyclist bending forward to reach the valve while setting the valve only by feel and estimation of the valve toggle position while steering with only one hand. If not accurately positioned in the RES position, an insufficient supply of fuel will be delivered to the engine and poor performance of the motorcycle will result. This will lead to the cyclist again bending over to reach the valve toggle until the valve is correctly positioned to supply the fuel demand of the engine. This introduces an unsafe factor into the riding and operation of the motorcycle.

The present invention overcomes the difficulties presented when it becomes necessary for a cyclist to switch the fuel valve to the RES position and contributes to the safety of operation of a motorcycle. This invention provides a positive indication when a fuel valve is correctly moved to the RES position.

An object of this invention is to provide a new and improved manually operated fuel valve for a vehicle operating on gravity fuel feed.

Another object of this invention is to provide a new and improved manually operated fuel valve for a motorcycle, which provides a positive audible indication when the valve is correctly positioned in the RES position, and which further provides a positive feel to the cyclist when the valve is moved into the RES position.

A further object of this invention is to provide a new and improved gravity feed valve, which contributes to safer operation of a vehicle when the valve must be moved to the RESERVE fuel position.

SUMMARY OF THE INVENTION

Briefly stated, the invention, in one form thereof comprises a manually operated fuel valve having OFF, ON and RESERVE positions which comprises a valve body with a standpipe extending therefrom for receiving fuel from a fuel tank and supplying fuel to an engine when the valve is in an ON position. the valve body defines a first passage therethrough in communication with the standpipe for permitting passage of fuel to a fuel exit port when the valve is in the ON position. The valve body defines a second passage therethough for fuel to said exit port when the valve is in a RESERVE position. A rotatable fuel regulator member is positioned in the valve body for blocking the second passage when the regulator member is in a valve ON position and permitting passage of fuel through the standpipe and the first passage. The regulator member is effective to block passage of fuel from passing through both of the passages when rotated to an OFF position. The regulator has a third positive RES position intermediate the ON and OFF positions for permitting passage of fuel from the tank to the exit port through the second passage when the level of fuel in the tank falls below the top of the standpipe, and means are coupled to the regulator member for rotation therewith and arranged to provide a positive indication when the regulator is in the third position.

The invention is particularly pointed out and distinctly claimed in the concluding portion of this specification. The invention, however, both as to organization and operation and together with further objects and advantages thereof may be best appreciated by reference to the following detailed description taken in conjunction with the drawings.

BRIEF DESCRIPTION OF THE DRAWINGS

FIG. 5 is an enlarged view of a portion of FIG. 1 showing additional elements of the valve of FIG. 1 in exploded view.

DETAILED DESCRIPTION OF PREFERRED EMBODIMENT OF THE INVENTION

Figure 1:
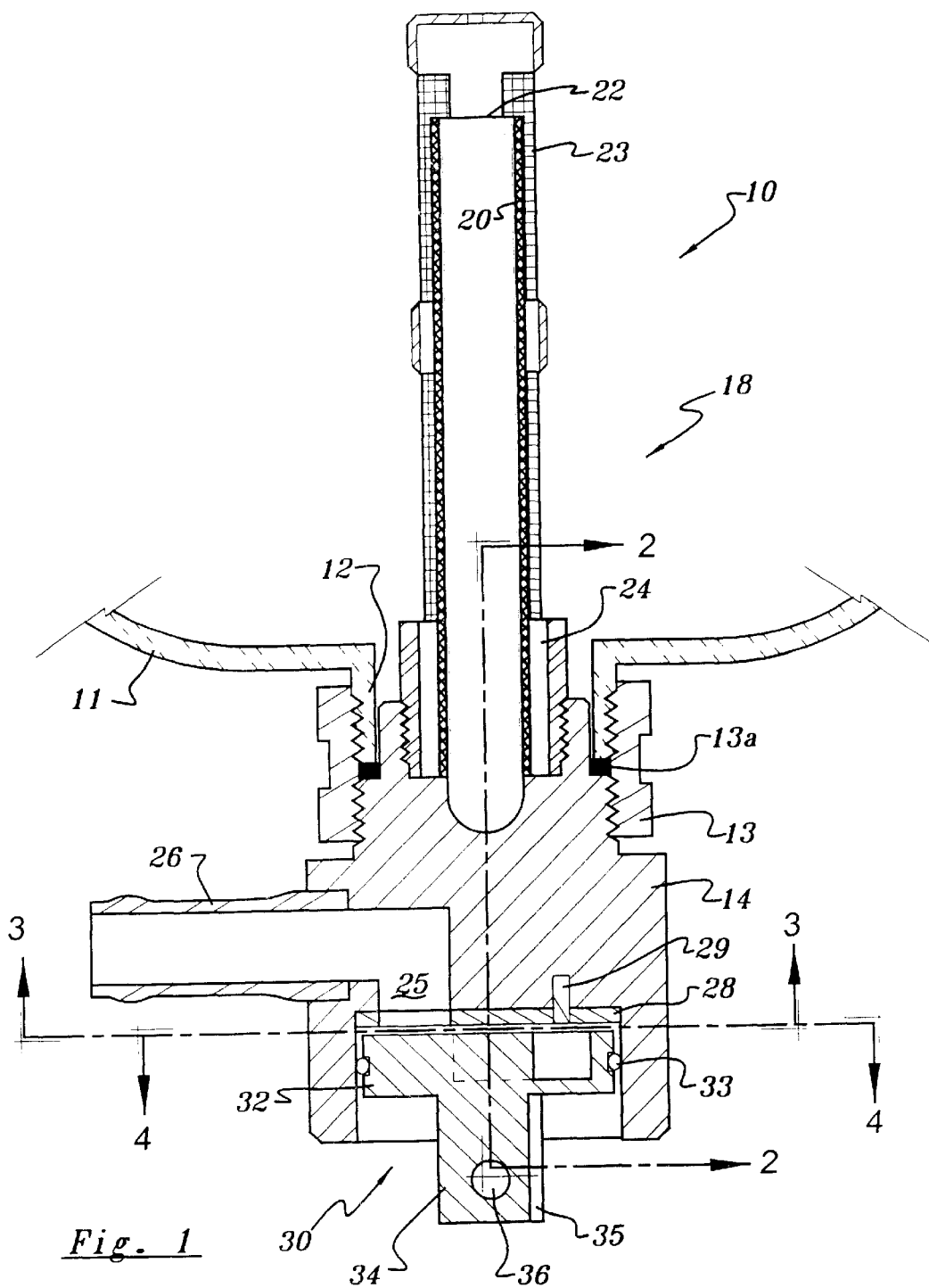
FIG. 1 is a side elevation, in half section of a valve in which the invention may be embodied.

FIG. 1 shows, in vertical half section a valve 10 embodying the invention attached to the underside of a gas tank 11 of a vehicle such as a motor cycle. Gas tank 11 has a threaded boss 12 thereon which receives a valve securing nut 13, which also supports valve 10.

Figure 2:
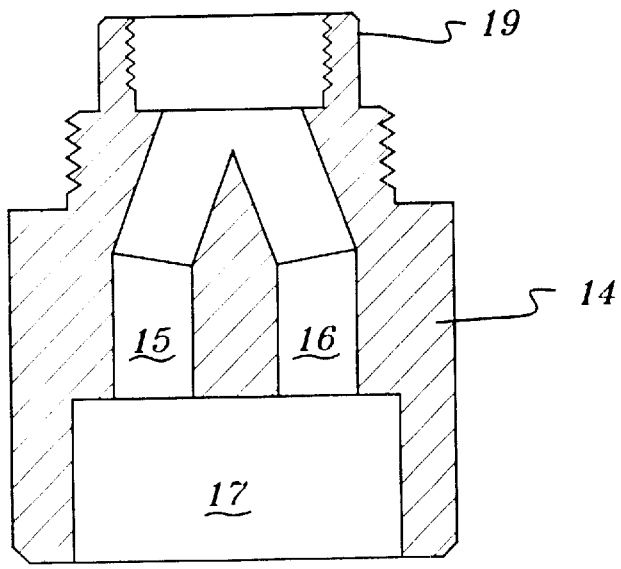
FIG. 2 is a sectional view seen in the plane of lines 2—2 of FIG. 1 with two elements removed.

Valve 10 comprises a body member 14, also shown in FIG. 2, having two fuel passages 15 and 16 defined therein leading to a cavity 17. In FIG. 2, the elements 28 and 30 are not shown for clarity of illustration. A standpipe assembly 18 is threadably received within upper annular collar 19 of body member 14. Standpipe assembly 18 includes a standpipe 20 having an upper opening 22 and standpipe 20 is surrounded by a fuel filter mesh 23. Standpipe 20 is axially offset within filter 23 and communicates with only one of passages 15 or 16 in valve body 14 at a time. The other of passages 15 or 16 is open to the fuel tank 11. For purposes of disclosure and discussion passage 16 is connected to standpipe 20 through passage 16 and passage 15 is unblocked when the valve is in the RES position. The standpipe assembly extends from a support member 24, which is treadably received in collar 19 of body 14. A sealing gasket or ring 13a extends about collar 19 within nut 13.

Figure 3:
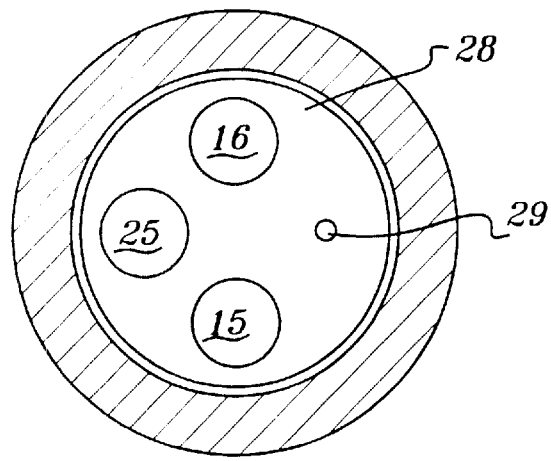
FIG. 3 is a sectional view seen in the plane of lines 3—3 of FIG. 1.

A fuel exit passage 25 is defined in body 14 as shown in FIGS. 1 and 3, and leads to a nipple 26 secured in body 14.

Nipple 26 receives a flexible tube thereon leading to the engine of the motorcycle (not shown).

A gasket 28 of low friction material such as Teflon is received in cavity 17. Gasket 28 has apertures therethrough in alignment with passages 15, 16 and 25, and also a socket, which receives a locating, pin or plug 29 as shown in FIGS. 1 and 3.

In FIG. 1, a space is shown between gasket 28 and a flow regulator member 30 for clarity of illustration. Flow regulator comprises an upper annular portion 32 having a circumferential groove receiving an O-ring seal 33. A stem 34 depends from upper annular portion 32 and has a vertical groove 35 therein for purposes herein after described. Stem 34 also has a passage 36 therethrough adapted to receive a portion of an operating lever hereinafter exemplified.

Figure 4:
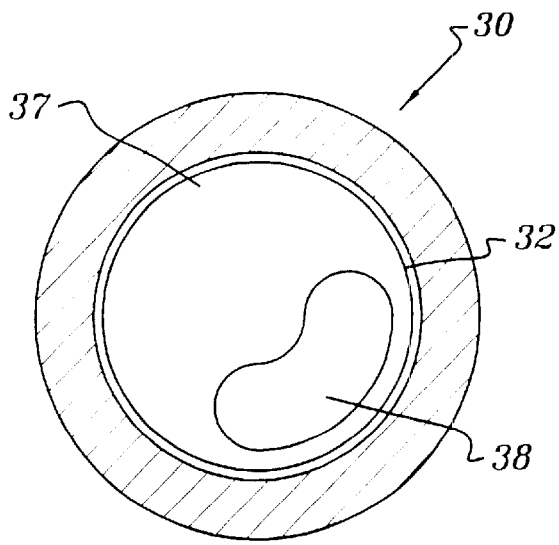
FIG. 4 is a sectional view seen in the plane of lines 4—4 of FIG. 1.

The upper surface 37 (FIG. 4) of flow regulator 30 is planar and in contact with gasket 28. A generally arcuate shaped cavity or recess 38 is defined from upper surface 37 into annular portion 32 to provide communication between passage 15 or 16 and fuel exit passage 25 dependent on the angular position of flow regulator 30. Flow regulator surface 30 also may completely block both of passages 15 and 16 when flow regulator 30 is in an OFF position. As hereinafter explained, flow regulator 30 has three distinct positions, ON, OFF and RESERVE. As shown in FIGS. 1 and 4, flow regulator 30 is in an ON position to provide communication between passage 16 and furl exit port 25.

Reference is now made to FIG. 5 which illustrates in exploded form mechanism utilized in the invention in conjunction with the lower portion of FIG. 1 which is fitted into cavity 17 about flow regulator stem 34. The various elements of FIG. 5 are shown spaced along a centerline C.

Figure 6:
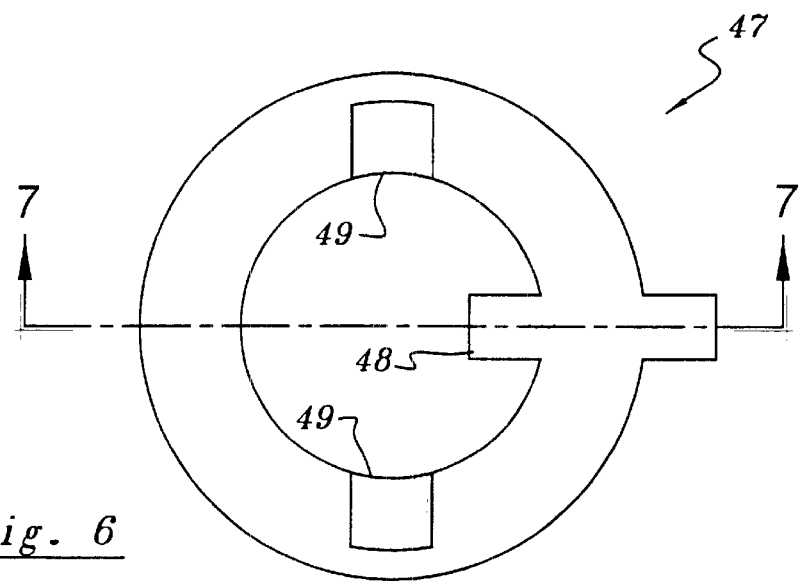
FIG. 6 is a view seen in the plane of lines 6—6 of FIG. 5.
Figure 7:
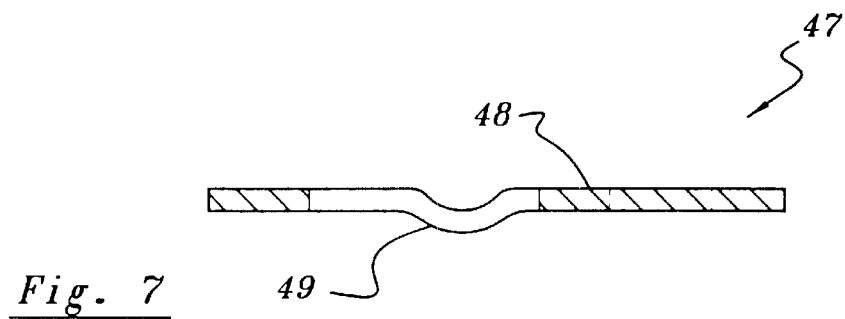
FIG. 7 is a sectional view seen in the planes of lines 7—7 of FIG. 6.

The lower end of cavity 17 receives a bottom cap 41 (FIGS. 5 and 8) having an upstanding annular flange 42 which has a press fit with the inside of the cylindrical wall defining cavity 17 in valve body 14. Bottom cap 41 also has a lower skirt 43 depending therefrom with edges 43a and 43b subtending slightly less than one hundred eighty degrees. Bottom cap 41 has a central aperture 44 therethrough. Defined in surface 45 of bottom cap are diametrically opposed detent recesses 46 extending from the edges defining aperture 44. A detent member in the form of washer 47 (FIGS. 5, 6 and 7) is received about stem 34 of regulator member 30 and has an ear 48 located in groove 35 to render washer 47 rotatable with regulator member 30. Detent washer 47 has diametrically opposed detents 49 extending from the bottom thereof and adapted to fit into detent recesses 46 in surface 45 of bottom cap 41 when regulator member 30 is in the fuel RES position. At that position recess 38 provides communication between passage 15 in valve body 14 and exit port 25, and fuel is fed from tank 11 when the fuel level is below the top opening 22 in standpipe 20. The number of detents 49 and detent recesses 46 may be increased.

Detent washer 47 is biased against bottom cap 41 by a compression spring 50. Spring 50 is received about regulator stem 34. Also disposed about stem 30 are an o-ring 51, a flat washer 52 and another o-ring 53 between annular portion 32 of regulator 30 and detent washer 47.

Figure 9:
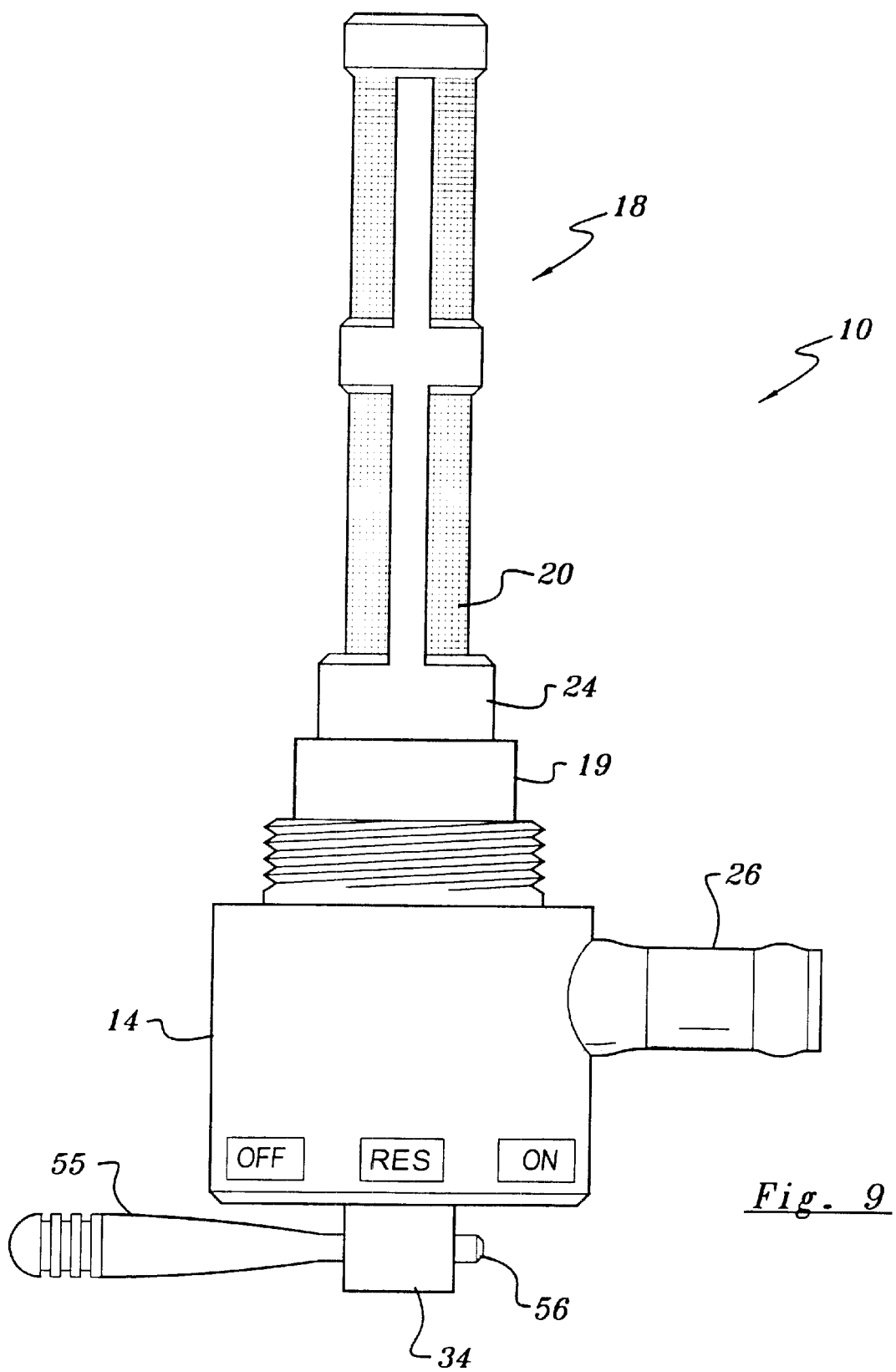
FIG. 9 is a perspective view of an assembled valve.

A fully assembled valve embodying the invention is shown in FIG. 9, less securing nut 25. A operating handle or toggle 55 for the valve has a shank portion 56 fitted through passage 36 in regulator stem 34.

Figure 8:
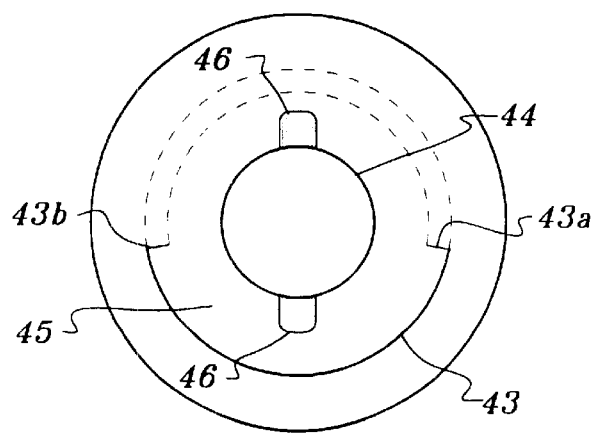
FIG. 8 is a view seen in the plane of lines 8—8 of FIG. 5.

In FIG. 9, the valve is shown in the OFF position determined by toggle 55 being in contact with an edge of skirt 43 (FIG. 8). In this position, surface 37 of regulator member blocks both of fuel passages 15 and 16 through valve body 14. When the cyclist wants to start the vehicle, toggle is moved to the ON position, passage 16 is in communication with fuel exit port 25 and fuel will gravity feed to the engine. When the fuel in tank 11 is depleted to the extent it will no longer enter the end 22 of standpipe 20, the engine will begin to sputter. The cyclist then moves toggle 55 to the RES position. Passage 15 is then placed in communication with exit port 25 through recess 38 in regulator member 30 and fuel will flow to the engine.

As the toggle is moved into the RES position, detents 49 move into detent recesses 46 under the bias of spring 50 and snap into the recesses 46 with the lower surface of detent member making full surface contact with surface 45 of cap member 41. This surface contact between produces a sharp audible "click". This audible "click" is heard by the cyclist and is an indication of the regulator member being accurately position in the RES position. Also, the cyclist will feel the detents entering the detent recesses and increased resistance to further rotation of toggle 55. The cyclist then knows that the valve is accurately positioned in the reserve, RES, fuel position.

After the cyclist has set the regulator valve to the RES position, the Cyclist will seek to refuel. Prior to refueling, the regulator is moved to the OFF position. This causes surface 37 to block both of passages 15 and 16. The valve is then moved to the ON position when the motor is to be restarted.

The provision of the means to set the valve accurately to the RES position and inform the cyclist when it has been properly so set greatly enhances the safety of operation of the vehicle. The cyclist will hear the "click" of the detents falling into the detent recesses and will also feel this through the toggle as the detents fall into place. The cyclist will be assured that the valve is fully open in the RES position and may pay full attention to the operation of the vehicle.

It may thus be seen that the objects of the invention set forth above as well as those made apparent are efficiently attained. While a preferred embodiment of the invention has been set forth for purposes of disclosure, modifications to the disclosed embodiments as well as other embodiments of the invention may occur to those skilled in the art. Accordingly, the appended claims are intended to cover all modifications to the disclosed embodiments of the invention as well as other embodiments thereof which do not depart from the spirit and scope of the invention.

What is claimed is:

1. A manually operated fuel valve having OFF, ON and RESERVE positions which comprises a valve body with a standpipe extending therefrom for receiving fuel from a fuel tank and supplying fuel to an engine when said valve is in an ON position, said valve body defining a first passage therethrough in communication with said standpipe for permitting passage of fuel to a fuel exit port when said valve is in the ON position, said valve body defining a second passage therethough for fuel to said exit port when said valve is in a RESERVE position, a rotatable regulator member in said valve body for blocking said second passage when said regulator member is in a valve ON position and permitting passage of fuel through said standpipe and said first passage, said regulator member being effective to block passage of fuel from passing through both of said passages when rotated to an OFF position said regulator having a third position intermediate said ON and OFF positions for permitting passage of fuel from the tank to said exit port through said second passage when the level of fuel in the tank falls below the top of said standpipe, and means coupled to said regulator member for rotation therewith and arranged to provide a positive indication when said regulator is rotated to said third position.

2. The valve of claim 1 wherein said valve body has a cylindrical wall defining a lower cavity, said regulator member having an upper annular head in sealing engagement with said cylindrical wall, a stem extending downwardly from said head and extending beyond said cylindrical wall, a bottom cap member received in and closing said cavity, said stem extending through said cap member, a toggle member extending from said stem for rotating said regulator member, said cap member providing detent recesses on an upper surface thereof, a detent member disposed about said stem and coupled thereto, resilient biasing means disposed about said stem between said head and said detent member and urging said detent member into contact with said upper surface of said cap member, said detent member having detents thereon arranged to snap into said detent recesses when said regulator member is in said third position.

3. The valve of claim 2 said detent member is keyed to said stem.

4. The valve of claim 2 wherein said positive indication is an audible sound made by said detents being forced into said detent recesses under the bias of said resilient biasing means.

5. The valve of claim 2 wherein said detent recesses are defined in said upper surface of said cap member, and said detent member is a washer like member.

6. The valve of claim 1 wherein said positive indication is audible.

* * * * *